(12) United States Patent
Bao et al.

(10) Patent No.: US 12,094,234 B2
(45) Date of Patent: Sep. 17, 2024

(54) METHOD AND APPARATUS FOR DETECTING BODY

(71) Applicants: Beijing Jingdong Shangke Information Technology Co., Ltd., Beijing (CN); Beijing Jingdong Century Trading Co., Ltd., Beijing (CN)

(72) Inventors: Qian Bao, Beijing (CN); Wu Liu, Beijing (CN); Tao Mei, Beijing (CN)

(73) Assignees: Beijing Jingdong Shangke Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 520 days.

(21) Appl. No.: 17/602,969

(22) PCT Filed: Mar. 26, 2020

(86) PCT No.: PCT/CN2020/081314
§ 371 (c)(1),
(2) Date: Oct. 11, 2021

(87) PCT Pub. No.: WO2020/215974
PCT Pub. Date: Oct. 29, 2020

(65) Prior Publication Data
US 2022/0198816 A1    Jun. 23, 2022

(30) Foreign Application Priority Data
Apr. 24, 2019   (CN) .................... 201910331939.9

(51) Int. Cl.
*G06V 40/10*    (2022.01)
*G06T 7/73*     (2017.01)
(Continued)

(52) U.S. Cl.
CPC ............... *G06V 40/10* (2022.01); *G06T 7/73* (2017.01); *G06V 10/255* (2022.01); *G06V 10/46* (2022.01);
(Continued)

(58) Field of Classification Search
CPC ...... G06V 40/10; G06V 10/255; G06V 10/46; G06V 10/757; G06V 10/759;
(Continued)

(56) References Cited

U.S. PATENT DOCUMENTS

| | | | |
|---|---|---|---|
| 8,229,164 B2 * | 7/2012 | Miyamoto | ........... G06V 40/103 382/103 |
| 8,422,759 B2 | 4/2013 | Kato et al. | |

(Continued)

FOREIGN PATENT DOCUMENTS

| | | |
|---|---|---|
| CN | 106355188 A | 1/2017 |
| CN | 108009466 A | 5/2018 |

(Continued)

OTHER PUBLICATIONS

G. Papandreou, et al., "Towards Accurate Multi-person Pose Estimation in the Wild", CVF; IEEE Xplore; 2017; pp. 4903-4911.

(Continued)

*Primary Examiner* — Tom Y Lu
(74) *Attorney, Agent, or Firm* — Blank Rome LLP

(57) ABSTRACT

Embodiments of the present application disclose a method and apparatus for detecting a body. A particular embodiment of the method comprises: acquiring a set of candidate body image region in a target image; for a candidate body image region in the set of candidate body image region: acquiring position information and confidences of candidate body key points in the candidate body image region; determining the candidate body key points within a body contour according to body contour information in the candidate body image (Continued)

region and the acquired position information; and determining a confidence score of the candidate body image region according to a sum of the confidences of the candidate body key points within the body contour; and determining a body image region from the set of candidate body image regions according to the confidence scores of the candidate body image regions in set of the candidate body image regions.

20 Claims, 6 Drawing Sheets

(51) Int. Cl.
*G06V 10/20* (2022.01)
*G06V 10/46* (2022.01)
*G06V 10/74* (2022.01)
*G06V 10/75* (2022.01)
*G06V 10/82* (2022.01)

(52) U.S. Cl.
CPC .......... *G06V 10/757* (2022.01); *G06V 10/759* (2022.01); *G06V 10/761* (2022.01); *G06V 10/82* (2022.01); *G06T 2207/20076* (2013.01); *G06T 2207/20084* (2013.01); *G06T 2207/30196* (2013.01)

(58) Field of Classification Search
CPC ...... G06V 10/761; G06V 10/82; G06V 10/44; G06V 10/462; G06V 40/103; G06T 7/73; G06T 2207/20076; G06T 2207/20084; G06T 2207/30196; G06T 2207/20081
See application file for complete search history.

(56) References Cited

U.S. PATENT DOCUMENTS

| | | | |
|---|---|---|---|
| 8,766,977 B2 | 7/2014 | Kim et al. | |
| 10,083,352 B1 | 9/2018 | Solh et al. | |
| 10,853,623 B2* | 12/2020 | Du | G06N 3/08 |
| 11,030,444 B2* | 6/2021 | Wang | G06T 7/70 |
| 11,163,991 B2* | 11/2021 | Weng | G06V 10/764 |
| 2017/0213359 A1 | 6/2017 | Zhou et al. | |
| 2018/0157931 A1 | 6/2018 | D'Ercoli et al. | |
| 2019/0197299 A1 | 6/2019 | Weng | |
| 2020/0210764 A1* | 7/2020 | Hamedi | G06V 10/776 |

FOREIGN PATENT DOCUMENTS

| | | |
|---|---|---|
| CN | 108038469 A | 5/2018 |
| CN | 108121952 A | 6/2018 |
| CN | 108122247 A | 6/2018 |
| CN | 108205655 A | 6/2018 |
| CN | 108710868 A | 10/2018 |
| CN | 108898087 A | 11/2018 |
| CN | 110046600 A | 7/2019 |
| JP | 2010/218556 A | 9/2010 |
| JP | 2011/191928 A | 9/2011 |

OTHER PUBLICATIONS

International Search Report for PCT/CN2020/081314, dated Jul. 1, 2020, 2 pgs.
Z. Yang, et al., "Pedestrian Detection Aided by Fusion of Binocular Information", Pattern Recognition, vol. 60, 2016, pp. 227-238.
D. Dexuan, "Research on Face Detection Based on Deep Learning", A Master Thesis Submitted to University of Electronic Science and Technology of China, 2017, 84 pgs.
Chinese Office Action for CN201910331939.9, dated Sep. 1, 2020, 8 pgs.
Zhao, "Research on Key Technologies of Image-Based Pedestrian Detection", Department of Computer Science and Technology Nanjing University; May 2015; 70 pgs.

* cited by examiner

METHOD AND APPARATUS FOR DETECTING BODY

CROSS-REFERENCE TO RELATED APPLICATIONS

This patent application is a national phase application of PCT/CN2020/081314, filed on Mar. 26, 2020, which claims priority to Chinese patent Application No. 201910331939.9, on Apr. 24, 2019, entitled "Method and Apparatus for Detecting Body." The entire disclosures of which are hereby incorporated by reference.

TECHNICAL FIELD

Embodiments of the present disclosure relate to the field of computer technology, and in particular to a method and apparatus for detecting a body.

BACKGROUND

With the rapid development of computer technology, digital image processing technology is developing more and more rapidly, and has penetrated into all aspects of life. As one of the important research topics in the field of digital image processing technology, body detection is widely used in various fields such as national defense and military, public transportation, social security and commercial applications. The so-called body detection refers to detecting and locating a body in a picture, and returning body rectangle frame coordinates. Body detection is the basis of body posture analysis, body behavior analysis, etc. The existing body detection methods are mainly carried out through body detection models.

SUMMARY

Embodiments of the present disclosure propose a method and apparatus for detecting a body.

In a first aspect, some embodiments of the present disclosure provide a method for detecting a body, and the method includes: acquiring a set of candidate body image regions in a target image, based on a body detection model; for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information of the candidate body key points; and determining a confidence score of the candidate body image region based on a sum of the confidences of the candidate body key points within the body contour; and determining a body image region from the set of candidate body image regions, based on confidence scores of the candidate body image regions in the set of candidate body image regions.

In some embodiments, after the determining a body image region from the set of candidate body image regions, based on confidence scores of the candidate body image regions in the set of candidate body image regions, the method further comprises: determining the candidate body key points in the determined body image region as body key points of the body contour.

In some embodiments, the acquiring a set of candidate body image regions in a target image, based on a body detection model, comprises: acquiring, based on the body detection model, the set of candidate body image regions in the target image and a confidence that the candidate body image region in the set of candidate body image regions is the determined body image region; and the determining a confidence score of the candidate body image region based on a sum of the confidences of the candidate body key points within the body contour, comprises: determining the confidence score of the candidate body image region, based on the sum of the confidences of the candidate body key points within the body contour and the confidence that the candidate body image region is the determined body image region.

In some embodiments, the determining the confidence score of the candidate body image region, based on the sum of the confidences of the candidate body key points within the body contour and the confidence that the candidate body image region is the determined body image region, comprises: performing, based on a preset weight, weighted summation of the sum of the confidences of the candidate body key points within the body contour, the confidence that the candidate body image region is the determined body image region, and a sum of confidences of candidate body key points outside the body contour, to obtain the confidence score of the candidate body image region, wherein a weight set for the sum of the confidences of the candidate body key points within the body contour, is greater than a weight set for the sum of the confidences of the candidate body key points outside the body contour.

In some embodiments, the acquiring position information of candidate body key points in the candidate body image region, comprises: acquiring the position information of candidate body key points in the candidate body image region, based on a convolutional neural network model.

In some embodiments, the acquiring position information of candidate body key points in the candidate body image region, comprises: determining, by a cascading network structure, the position information of candidate body key points in the candidate body image region, combined with global information and local information of the candidate body image region.

In some embodiments, the cascading network structure is a cascaded network structure obtained by cascading multiple identical network models in sequence; a full convolutional layer is connected to an end of a last network model in the cascading network structure, to output a heat map corresponding to each candidate body key point; the heat map represents a probability that the candidate body key point exists in each pixel point of the candidate body image region; and one heat map corresponds to one candidate body key point.

In some embodiments, the acquiring position information of candidate body key points in the candidate body image region, comprises: for each heat map: determining a position of a pixel point with a greatest probability in the candidate body image region based on the heat map; and determine the determined position as a position of a candidate body key point corresponding to the heat map.

In some embodiments, for each heat map: a confidence of the candidate body key point corresponding to the heat map is a probability corresponding to the pixel point with a greatest probability determined based on the heat map.

In some embodiments, the determining a body image region from the set of candidate body image regions, based on confidence scores of the candidate body image regions in the set of candidate body image regions, comprises: determining, from the set of candidate body image regions, a candidate body image region having a confidence score exceeding a preset score threshold, or a candidate body image region ranked a first preset number of candidate body image regions according to the confidence score in descending order; searching redundant candidate body image regions from the determined candidate body image region in the set of candidate body image regions; and removing the searched candidate body image regions.

In some embodiments, the searching redundant candidate body image regions from the determined candidate body image region in the set of candidate body image regions, comprises: for the candidate body image region in the set of candidate body image regions: determining a contour center distance based on the body contour information in the candidate body image region and body contour information in the determined candidate body image region; determining a similarity based on a distance between the candidate body key points included in the candidate body image region and candidate body key points included in the determined candidate body image region; and determining, in response to determining that the contour center distance is less than a preset distance threshold, and the determined similarity is greater than a preset similarity threshold, the candidate body image region is the redundant candidate body image region.

In a second aspect, some embodiments of the present disclosure provide an apparatus for detecting a body, and the apparatus includes: an acquisition unit, configured to acquire a set of candidate body image regions in a target image, based on a body detection model; a first determination unit, configured to, for a candidate body image region in the set of candidate body image regions: acquire position information and confidences of candidate body key points in the candidate body image region, based on a single body key point detection model; determine the candidate body key points within a body contour based on body contour information in the candidate body image region and the acquired position information of the candidate body key points; and determine a confidence score of the candidate body image region based on a sum of the confidences of the candidate body key points within the body contour; and a second determination unit, configured to determine a body image region from the set of candidate body image regions, based on confidence scores of the candidate body image regions in the set of candidate body image regions.

In some embodiments, the apparatus further comprises: a third determination unit, configured to determine the candidate body key points in the determined body image region as body key points of the body contour.

In some embodiments, the acquisition unit is further configured to: acquire, based on the body detection model, the set of candidate body image regions in the target image and a confidence that the candidate body image region in the set of candidate body image regions is the determined body image region; and the first determination unit is further configured to: determine the confidence score of the candidate body image region, based on the sum of the confidences of the candidate body key points within the body contour and the confidence that the candidate body image region is the determined body image region.

In some embodiments, the first determination unit is further configured to: Perform, based on a preset weight, weighted summation of the sum of the confidences of the candidate body key points within the body contour, the confidence that the candidate body image region is the determined body image region, and a sum of confidences of candidate body key points outside the body contour, to obtain the confidence score of the candidate body image region, wherein a weight set for the sum of the confidences of the candidate body key points within the body contour, is greater than a weight set for the sum of the confidences of the candidate body key points outside the body contour.

In some embodiments, the first determination unit is further configured to: acquire the position information of candidate body key points in the candidate body image region, based on a convolutional neural network model.

In some embodiments, the first determination unit is further configured to: determine, by a cascading network structure, the position information of candidate body key points in the candidate body image region, combined with global information and local information of the candidate body image region.

In some embodiments, the cascading network structure is a cascaded network structure obtained by cascading multiple identical network models in sequence; a full convolutional layer is connected to an end of a last network model in the cascading network structure, to output a heat map corresponding to each candidate body key point; the heat map represents a probability that the candidate body key point exists in each pixel point of the candidate body image region; and one heat map corresponds to one candidate body key point.

In some embodiments, the first determination unit is further configured to: for each heat map: determining a position of a pixel point with a greatest probability in the candidate body image region based on the heat map; and determine the determined position as a position of a candidate body key point corresponding to the heat map.

In some embodiments, for each heat map: a confidence of the candidate body key point corresponding to the heat map is a probability corresponding to the pixel point with a greatest probability determined based on the heat map.

In some embodiments, the second determination unit comprises: a determination subunit, configured to determine, from the set of candidate body image regions, a candidate body image region having a confidence score exceeding a preset score threshold, or a candidate body image region ranked a first preset number of candidate body image regions according to the confidence score in descending order; a searching subunit, configured to search redundant candidate body image regions from the determined candidate body image region in the set of candidate body image regions; and a removing subunit, configured to remove the searched candidate body image regions.

In some embodiments, the searching subunit is further configured to: for the candidate body image region in the set of candidate body image regions: determine a contour center distance based on the body contour information in the candidate body image region and body contour information in the determined candidate body image region; determine a similarity based on a distance between the candidate body key points included in the candidate body image region and candidate body key points included in the determined candidate body image region; and determining, in response to determining that the contour center distance is less than a preset distance threshold, and the determined similarity is greater than a preset similarity threshold, the candidate body image region is the redundant candidate body image region.

In a third aspect, some embodiments of the present disclosure provide a device, including: one or more processors; a storage apparatus, storing one or more programs thereon; the one or more programs, when executed by the one or more processors, cause the one or more processors to implement the method in the first aspect.

In a fourth aspect, some embodiments of the present disclosure provide a non-transitory computer-readable medium, storing a computer program thereon, the program, when executed by a processor, implements the method in the first aspect.

The method and apparatus for detecting a body provided in the embodiments of the present disclosure, by acquiring a set of candidate body image regions in a target image, then for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information of the candidate body key points; and determining a confidence score of the candidate body image region based on a sum of the confidences of the candidate body key points within the body contour, and finally determining a body image region from the set of candidate body image regions, based on confidence scores of the candidate body image regions in the set of candidate body image regions, provide a body detection mechanism based on body contour information and body key points.

BRIEF DESCRIPTION OF THE DRAWINGS

By reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described in detail below with reference to the accompanying drawings and embodiments. It may be understood that the specific embodiments described herein are only used to explain the related disclosure, but not to limit the disclosure. In addition, it should also be noted that, for ease of description, only parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
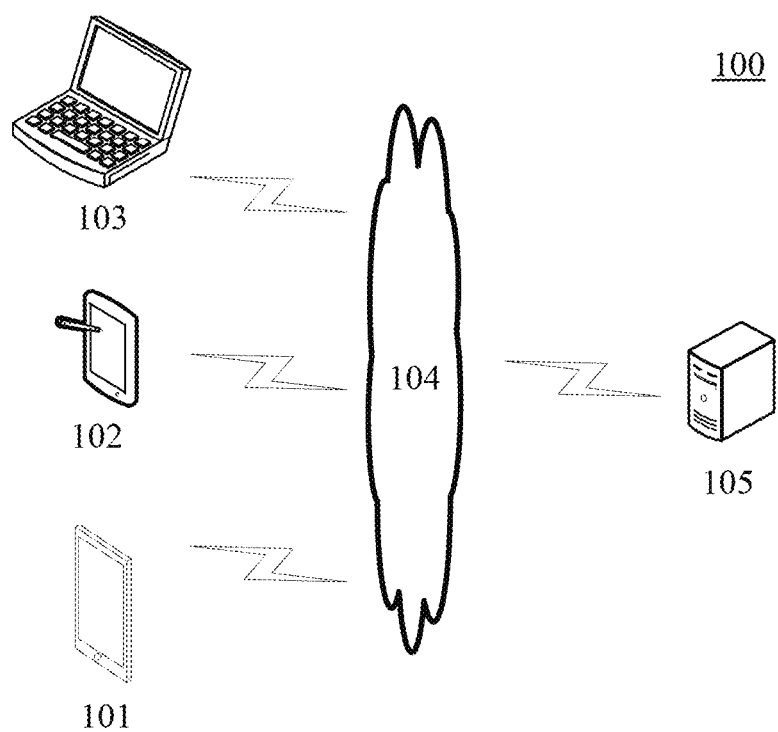
FIG. 1 is an exemplary system architecture diagram to which some embodiments of the present disclosure may be implemented.

FIG. 1 illustrates an exemplary system architecture 100 of an embodiment of a method for detecting a body or an apparatus for detecting a body to which the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102, 103, to receive or send messages and the like. Various client applications, such as image acquisition applications, image processing applications, e-commerce applications, or search applications, may be installed on the terminal devices 101, 102, and 103.

The terminal devices 101, 102, and 103 may be hardware or software. When the terminal devices 101, 102, and 103 are hardware, they may be various electronic devices having display screens, including but not limited to smart phones, tablet computers, laptop portable computers, desktop computers, or the like. When the terminal devices 101, 102, and 103 are software, they may be installed in the electronic devices listed above. They may be implemented as a plurality of software or software modules, or as a single software or software module, which is not specifically limited herein.

The server 105 may be a server that provides various services, for example, a backend server that provides support for applications installed on the terminal devices 101, 102, 103 and the server 105 may acquire a set of candidate body image regions in a target image, based on a body detection model; for a candidate body image region in the set of candidate body image regions: acquire position information and confidences of candidate body key points in the candidate body image region, based on a single body key point detection model; determine the candidate body key points within a body contour based on body contour information in the candidate body image region and the acquired position information; and determine a confidence score of the candidate body image region based on a sum of the confidences of the candidate body key points within the body contour; and determine a body image region from the set of candidate body image regions, based on confidence scores of the candidate body image regions in the set of candidate body image regions.

It should be noted that the method for detecting a body provided by the embodiments of the present disclosure may be performed by the server 105, or performed by the terminal devices 101, 102, 103. Correspondingly, the apparatus for detecting a body may be provided in the server 105, or provided in the terminal devices 101, 102, 103.

It should be noted that the server may be hardware or software. When the server is hardware, it may be implemented as a distributed server cluster composed of a plurality of servers, or as a single server. When the server is software, it may be implemented as a plurality of software or software modules (for example, for providing distributed services), or as a single software or software module, which is not specifically limited herein.

It should be understood that the number of terminal devices, networks, and servers in FIG. 1 is merely illustrative. Depending on the implementation needs, there may be any number of terminal devices, networks, and servers.

Figure 2:
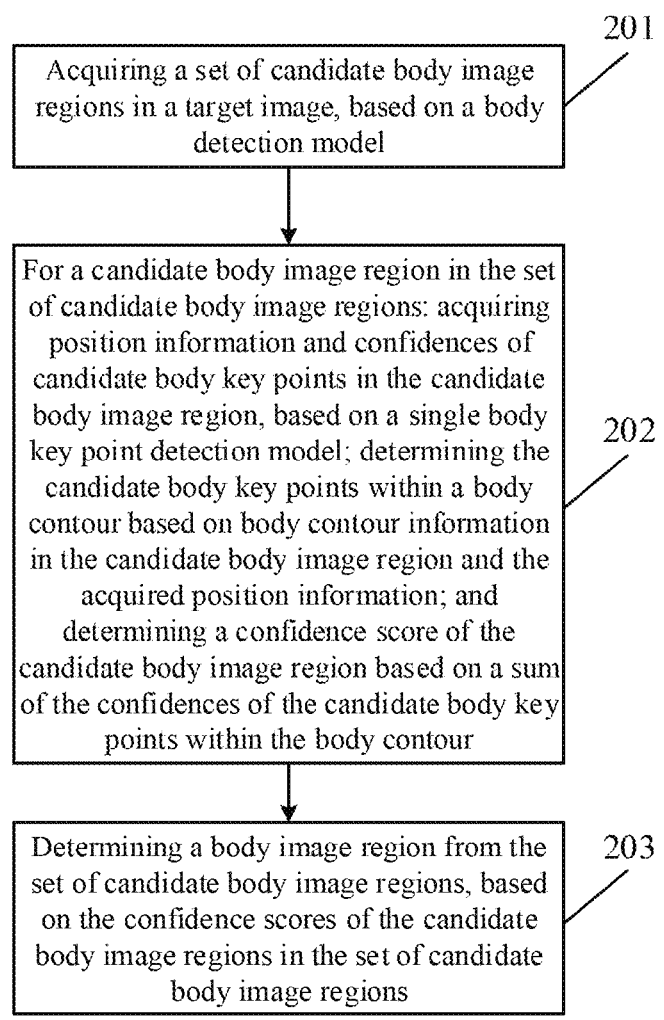
FIG. 2 is a flowchart of an embodiment of a method for detecting a body according to the present disclosure.

With further reference to FIG. 2, a flow 200 of an embodiment of a method for detecting a body according to the present disclosure is illustrated. The method for detecting a body includes the following steps:

Step 201, acquiring a set of candidate body image regions in a target image, based on a body detection model.

In the present embodiment, an executing body of the method for detecting a body (for example, the server or terminal shown in FIG. 1) may first acquire the set of candidate body image regions in the target image, based on the body detection model. The target image may include any image on which body detection is to be performed. The target image may be directly input to the body detection model, or the target image may be preprocessed first, and the preprocessed target image may be input to the body detection model. The body detection model may be constructed using target detection algorithms such as SSD, Faster R-CNN, YOLO, or R-FCN. The aforementioned Faster R-CNN, R-FCN, SSD, and YOLO are currently widely studied and applied well-known technologies, detailed description thereof will be omitted. Considering that the body detection model needs to ensure a recall rate, an algorithm having high body detection accuracy such as Faster R-CNN may be selected. The target image assumes that the target image contains N persons, and in the set of candidate body image regions obtained by the body detection model, it may include M candidate body image regions. Under the premise of ensuring the recall rate, M≥N.

Step 202, for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information; and determining a confidence score of the candidate body image region based on a sum of the confidences of the candidate body key points within the body contour.

In the present embodiment, the executing body may, for the candidate body image region in the set of candidate body image regions acquired in step 201: acquire the position information and the confidences of the candidate body key points in the candidate body image region, based on the single body key point detection model; determine the candidate body key points within the body contour based on the body contour information in the candidate body image region and the acquired position information; and determine the confidence score of the candidate body image region based on the sum of the confidences of the candidate body key points within the body contour. Since there is only one person in the candidate body image region obtained by the body detection model, the single body key point detection model is used to acquire the candidate body key points.

Key point estimation is a regression problem. Models such as convolutional neural networks (CNN) may be used to perform regression analysis, to determine position information of the candidate body key points in the candidate body image region, where the position information may be, for example, coordinate information. Due to the different scales of main key points of a body, for joints that are very obvious and difficult to make complex movements, such as the head, neck, and shoulders, a more accurate estimation of these key points may be obtained by directly using a CNN model. However, for key points that are easy to be blocked or invisible, such as hips, wrists, or ankles, it is necessary to use local information and increase a receptive field to further obtain accurate positions of these key points. An hourglass model may be used, or a cascading network structure may be used, to combine global information and local information to improve an accuracy of key point estimation. Where the network structure cascaded back and forth may be a cascaded network structure obtained by cascading multiple identical network models in sequence, for example, multiple hourglass models cascaded back and forth.

The following is an example of a cascading network structure formed by cascading back and forth multiple hourglass models.

Figure 3A:
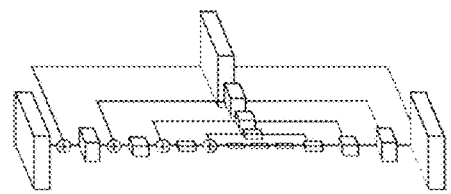
FIG. 3A is a schematic diagram of the external structure of a single hourglass model.
Figure 3B:
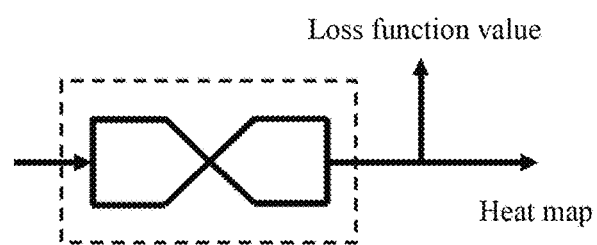
FIG. 3B is a schematic diagram of the internal structure of a single hourglass model.
Figure 3C:
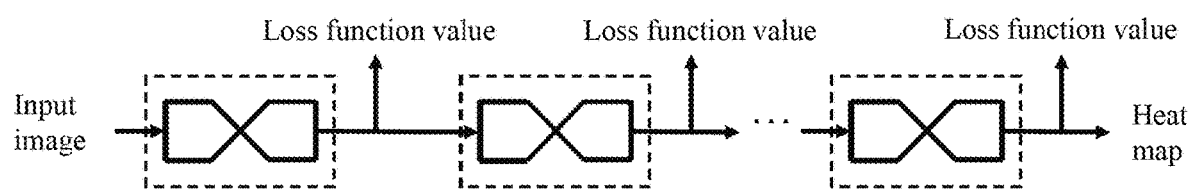
FIG. 3C is a schematic diagram of the cascading network structure obtained after multiple hourglass models are cascaded sequentially.

FIG. 3A is a schematic diagram of the external structure of a single hourglass model, and FIG. 3B is a schematic diagram of the internal structure of a single hourglass model. The hourglass model includes several residual network modules. The entire structure is symmetric. Low-resolution features are obtained through down-sampling, high-resolution features are obtained through up-sampling, and feature maps are added element by element. At an end of the hourglass model, two 1*1 full convolutional layers may be connected to output and obtain a heat map of each joint (i.e. each candidate body key point). One heat map corresponds to a candidate body key point. A difference between the heat map output by the hourglass model and a real heat map of the corresponding key point is calculated to obtain a loss function value of the candidate body key point. In order to improve the accuracy of key point estimation, a plurality of hourglass models may be cascaded sequentially to obtain a stacked hourglass model, as is illustrated in FIG. 3C. Since the heat map represents a probability of the existence of the candidate body key point at each pixel point in the candidate body image region, a position of a pixel point with maximum probability is found on each heat map output by the last hourglass model, that is, the position coordinates of the corresponding candidate body key point, and the maximum probability value is the confidence of the candidate body key point.

In the present embodiment, the body contour information may be information used to distinguish a body from the background, for example, a binary image that distinguishes a body from the background. The contour information may be performed on the candidate body image region in the set of candidate body image regions, and is independent of the determination of the key points. Contour detection may be performed. using existing semantic segmentation technology, or it may use an encoder-decoder structure similar to an hourglass structure. An end of a network output is a 1*1 full convolutional layer, connected to a normalized exponential function loss (softmax loss) layer. Contour detection may provide weak supervision information for key point estimation, so even rough contour detection can meet a demand. Compared with semantic segmentation, the use of the encoder-decoder structure similar to the hourglass structure may reduce requirements for labeling data quality and network complexity.

In the present embodiment, a corresponding relationship between the sum of the confidences of the candidate body key points within the body contour and the confidence score of the candidate body image region may be preset. For example, the set corresponding relationship may indicate that the larger the sum of the confidences of the candidate body key points within the body contour, the higher the confidence score of the candidate body image region. In addition, when determining the confidence score of the candidate body image region, a confidence that the candidate body image region is the determined body image region output by the body detection model may also be considered. Since some body key points may fall outside the body contour, a sum of confidences of candidate body key points outside the body contour may also be comprehensively considered to further improve an accuracy of the determined confidence score.

In some alternative implementations of the present embodiment, the acquiring a set of candidate body image regions in a target image, based on a body detection model, includes: acquiring the set of candidate body image regions in the target image, based on the body detection model, and a confidence that the candidate body image region in the set of candidate body image regions is the determined body image region; and the determining a confidence score of the candidate body image region based on a sum of the confidences of the candidate body key points within the body contour, includes: determining the confidence score of the candidate body image region, based on the sum of the confidences of the candidate body key points within the body contour and the confidence that the candidate body image region is the determined body image region.

In this implementation, the determining the confidence score of the candidate body image region, based on the sum of the confidences of the candidate body key points within the body contour and the confidence that the candidate body image region is the determined body image region may be performing, based on a preset weight, weighted summation of the sum of the confidences of the candidate body key points within the body contour, the confidence that the candidate body image region is the determined body image region, and the specific weight may be set according to actual needs, or may be obtained through training using a machine learning method.

In some alternative implementations of the present embodiment, the determining the confidence score of the candidate body image region, based on the sum of the confidences of the candidate body key points within the body contour and the confidence that the candidate body image region is the determined body image region, includes: performing, based on a preset weight, weighted summation of the sum of the confidences of the candidate body key points within the body contour, the confidence that the candidate body image region is the determined body image region, and a sum of confidences of candidate body key points outside the body contour, to obtain the confidence score of the candidate body image region, where a weight set for the sum of the confidences of the candidate body key points within the body contour, is greater than a weight set for the sum of the confidences of the candidate body key points outside the body contour. In this implementation, the specific weight may be set according to actual needs, or may be obtained through training using a machine learning method.

Step 203, determining a body image region from the set of candidate body image regions, based on the confidence scores of the candidate body image regions in the set of candidate body image regions.

In the present embodiment, the executing body may determine the body image region from the set of candidate body image regions, based on the confidence scores of the candidate body image regions in the set of candidate body image regions determined in step 202. In order to ensure the recall rate of the body detection model, redundant body image regions may inevitably occur in the set of candidate body image regions, therefore, the confidence score of the candidate body image region may be used to determine the body image region from the set of candidate body image regions.

In some alternative implementations of the present embodiment, after the determining a body image region from the set of candidate body image regions, based on the confidence scores of the candidate body image regions in the set of candidate body image regions, the method further includes: determining the candidate body key points in the determined body image region as body key points of the body contour.

In the present embodiment, the parameters of the body detection model in step 201, the parameters of the single body key point detection model in step 202, the parameters involved in determining the body contour information, and the parameters involved in determining the confidence score may be determined by manual settings, or may be obtained through training using a machine learning method. During training, sample data used may include sample pictures and labelling information, and the labelling information may include labelled body image regions or body key points. For example, a sample picture may be used as input, coordinates of labelled body key points may be used as output, and one or more of the above parameters may be obtained through training.

Before training, the sample data may be preprocessed. Preprocessing may include data cleaning and data enhancement. Data cleaning refers to removal of erroneous and incomplete labelling data in training data. Multi-person body key point labelling data usually contains body image region labelling errors and key point labelling errors, including missing coordinates and incorrect coordinates. Data enhancement may be to obtain expanded training data through rotation, size change, cropping, flipping, changing brightness of the original training data, etc., and to make the model have stronger generalization. In a data-enhanced crop step, a picture may be cropped without changing an aspect ratio of the picture, and the picture may be adjusted to a size of 256*256 after edges of the picture are zero-filled. While data enhancement is performed on the picture, corresponding operations such as rotation, size change, and flipping should also be performed on the labelling data.

The method provided by the above embodiment of the present disclosure provides a body detection mechanism based on body contour information and body key points, and improves an accuracy of body detection.

Figure 4:
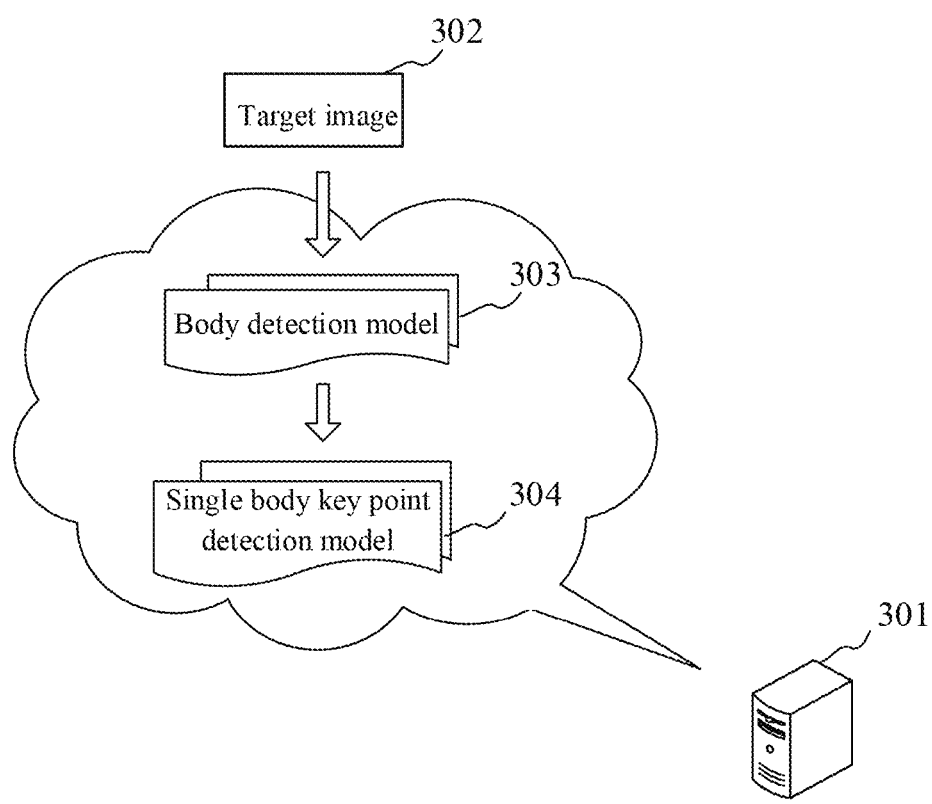
FIG. 4 is a schematic diagram of an application scenario of the method for detecting a body according to the present disclosure.

With further reference to FIG. 4, FIG. 4 is a schematic diagram of an application scenario of the method for detecting a body according to the present embodiment. In the application scenario of FIG. 4, a server 301 inputs a target image 302 into a body detection model 303 to acquire a set of candidate body image regions in the target image 302, and then for a candidate body image region in the set of candidate body image regions: inputs the candidate body image region into a single body key point detection model 304 to acquire position information and confidences of candidate body key points in the candidate body image region, and determines the candidate body key points within a body contour based on body contour information in the candidate body image region and the acquired position information, and then determines a confidence score of the candidate body image region based on a sum of the confidences of the candidate body key points within the body contour, and finally determines a body image region from the set of candidate body image regions, based on the confidence scores of the candidate body image regions in the set of candidate body image regions.

Figure 5:
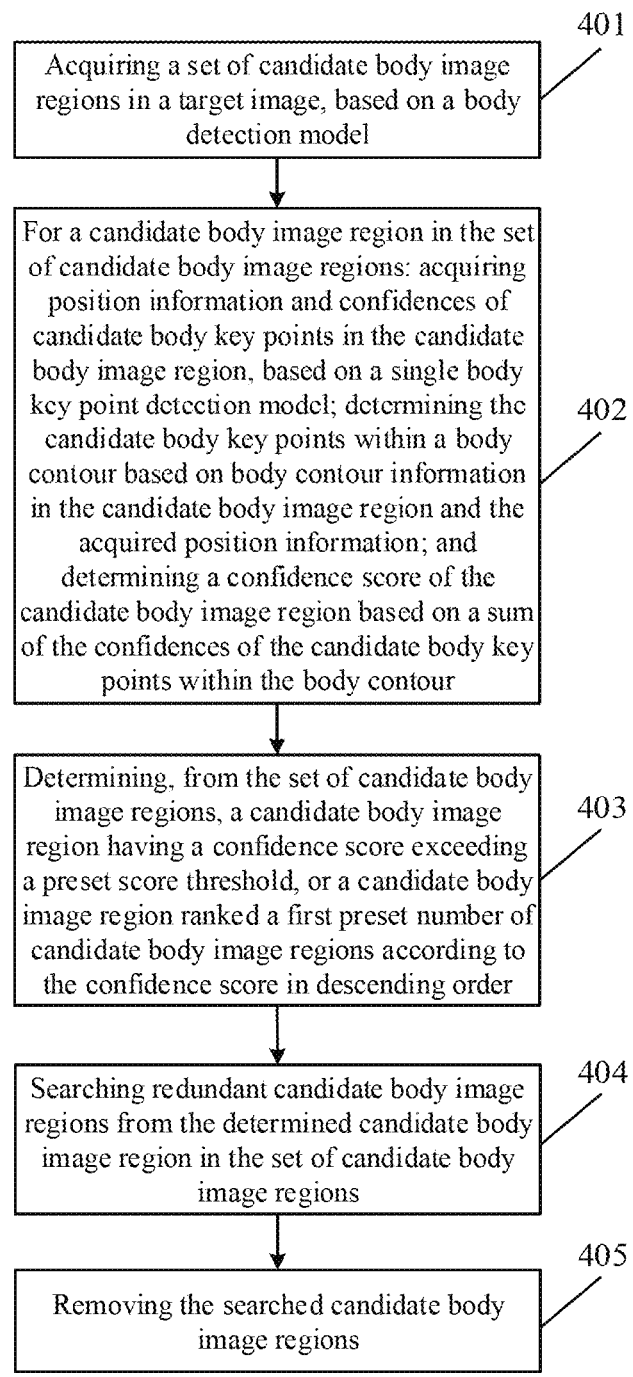
FIG. 5 is a flowchart of another embodiment of the method for detecting a body according to the present disclosure.

With further reference to FIG. 5, a flow 400 of another embodiment of the method for detecting a body is illustrated. The flow 400 of the method for detecting a body includes the following steps:

Step 401, acquiring a set of candidate body image regions in a target image, based on a body detection model.

In the present embodiment, an executing body of the method for detecting a body (for example, the server or terminal shown in FIG. 1) may first acquire the set of candidate body image regions in the target image, based on the body detection model.

Step 402, for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information; and determining a confidence score of the candidate body image region based on a sum of the confidences of the candidate body key points within the body contour.

In the present embodiment, the executing body may, for the candidate body image region in the set of candidate body image regions acquired in step 401: acquire the position information and the confidences of the candidate body key points in the candidate body image region, based on the single body key point detection model; determine the candidate body key points within the body contour based on the body contour information in the candidate body image region and the acquired position information; and determine the confidence score of the candidate body image region based on the sum of the confidences of the candidate body key points within the body contour.

Step 403, determining, from the set of candidate body image regions, a candidate body image region having a confidence score exceeding a preset score threshold, or a candidate body image region ranked a first preset number of candidate body image regions according to the confidence score in descending order.

In the present embodiment, the executing body may determine the candidate body image region having the confidence score exceeding the preset score threshold, or the candidate body image region ranked the first preset number of candidate body image regions according to the confidence score in descending order from the set of candidate body image regions. The score threshold and the preset number may be set according to actual needs. For example, the preset number may be 1, and the candidate body image region having the highest confidence score is determined.

Step 404, searching redundant candidate body image regions from the determined candidate body image region in the set of candidate body image regions.

In the present embodiment, the executing body may search the redundant candidate body image regions from the determined candidate body image region in the set of candidate body image regions determined in step 403. In order to ensure the recall rate of the body detection model, a redundant detection frame may inevitably appear. The redundancy may be determined by object keypoint similarity (OKS) and/or the contour center distance.

In some alternative implementations of the present embodiment, the searching redundant candidate body image regions from the determined candidate body image region in the set of candidate body image regions, includes: for the candidate body image region in the set of candidate body image regions: determining a contour center distance based on the body contour information in the candidate body image region and body contour information in the determined candidate body image region; and determining a similarity based on a distance between the candidate body key points included in the candidate body image region and candidate body key points included in the determined candidate body image region; in response to determining that the contour center distance is less than a preset distance threshold, and the determined similarity is greater than a preset similarity threshold, determining that the candidate body image region is the redundant candidate body image region.

Step 405, removing the searched candidate body image regions.

In the present embodiment, the executing body may remove the candidate body image regions searched in step 404. By removing redundant estimation of the same person, while not eliminating estimation of two persons who are close together, an accuracy of body detection is improved. When a body detection result is subsequently used to estimate the body key points, an accuracy of estimation of body key points of multiple persons in an entire image may also be further improved.

In the present embodiment, the operations of step 401 and step 402 are basically the same as the operations of step 201 and step 202, and detailed description thereof will be omitted.

It can be seen from FIG. 5 that, compared with the embodiment corresponding to FIG. 2, in the flow 400 of the method for detecting a body in the present embodiment, by determining the candidate body image region having high confidence score in the set of candidate body image regions, and then removing the redundant regions of the region, the accuracy of determining a body image region is further improved.

Figure 6:
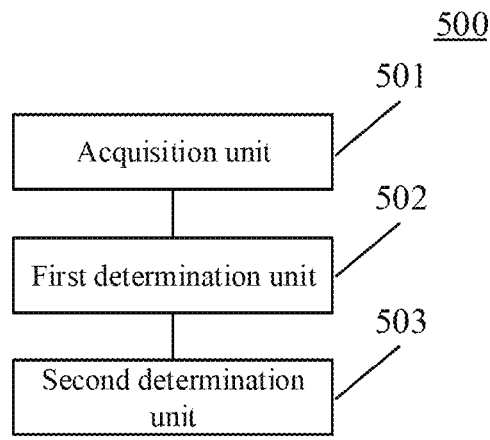
FIG. 6 is a schematic structural diagram of an embodiment of an apparatus for detecting a body according to the present disclosure.

With further reference to FIG. 6, as an implementation of the method shown in the above figures, the present disclosure provides an embodiment of an apparatus for detecting a body, and the apparatus embodiment corresponds to the method embodiment as shown in FIG. 2. The apparatus may be specifically applied to various electronic devices.

As shown in FIG. 6, an apparatus 500 for detecting a body of the present embodiment includes: an acquisition unit 501, a first determination unit 502, a second determination unit 503. The acquisition unit is configured to acquire a set of candidate body image regions in a target image, based on a body detection model. The first determination unit is configured to, for a candidate body image region in the set of candidate body image regions: acquire position information and confidences of candidate body key points in the candidate body image region, based on a single body key point detection model; determine the candidate body key points within a body contour based on body contour information in the candidate body image region and the acquired position information; and determine a confidence score of the candidate body image region based on a sum of the confidences of the candidate body key points within the body contour. The second determination unit is configured to determine a body image region from the set of candidate body image regions, based on the confidence scores of the candidate body image regions in the set of candidate body image regions.

In the present embodiment, for the specific processing of the acquisition unit 501, the first determination unit 502, the second determination unit 503 of the apparatus 500 for detecting a body, reference may be made to step 201, step 202, and step 203 in the embodiment corresponding to FIG. 2.

In some alternative implementations of the present embodiment, the apparatus further includes: a third determination unit, configured to determine the candidate body key points in the determined body image region as body key points of the body contour.

In some alternative implementations of the present embodiment, the acquisition unit is further configured to: acquire the set of candidate body image regions in the target image, based on the body detection model, and a confidence that the candidate body image region in the set of candidate body image regions is the determined body image region; and the first determination unit is further configured to: determine the confidence score of the candidate body image region, based on the sum of the confidences of the candidate body key points within the body contour and the confidence that the candidate body image region is the determined body image region.

In some alternative implementations of the present embodiment, the first determination unit is further configured to: perform, based on a preset weight, weighted summation of the sum of the confidences of the candidate body key points within the body contour, the confidence that the candidate body image region is the determined body image region, and a sum of confidences of candidate body key points outside the body contour, to obtain the confidence score of the candidate body image region, where a weight set for the sum of the confidences of the candidate body key points within the body contour, is greater than a weight set for the sum of the confidences of the candidate body key points outside the body contour.

In some alternative implementations of the present embodiment, the first determination unit is further configured to: acquire the position information of candidate body key points in the candidate body image region, based on a convolutional neural network model.

In some alternative implementations of the present embodiment, the first determination unit is further configured to: determine, by a cascading network structure, the position information of candidate body key points in the candidate body image region, combined with global information and local information of the candidate body image region.

In some alternative implementations of the present embodiment, the cascading network structure is a cascaded network structure obtained by cascading multiple identical network models in sequence; a full convolutional layer is connected to an end of a last network model in the cascading network structure, to output a heat map corresponding to each candidate body key point; the heat map represents a probability that the candidate body key point exists in each pixel point of the candidate body image region; and one heat map corresponds to one candidate body key point.

In some alternative implementations of the present embodiment, acquiring position information of candidate body key points in the candidate body image region, comprises: for each heat map: determining a position of a pixel point with a greatest probability in the candidate body image region based on the heat map; and determine the determined position as a position of a candidate body key point corresponding to the heat map.

In some alternative implementations of the present embodiment, for each heat map: a confidence of the candidate body key point corresponding to the heat map is a probability corresponding to the pixel point with a greatest probability determined based on the heat map.

In some alternative implementations of the present embodiment, the second determination unit includes: a determination subunit, configured to determine, from the set of candidate body image regions, a candidate body image region having a confidence score exceeding a preset score threshold, or a candidate body image region ranked a first preset number of candidate body image regions according to the confidence score in descending order; a searching subunit, configured to search redundant candidate body image regions from the determined candidate body image region in the set of candidate body image regions; and a removing subunit, configured to remove the searched candidate body image regions.

In some alternative implementations of the present embodiment, the searching subunit is further configured to: for the candidate body image region in the set of candidate body image regions: determine a contour center distance based on the body contour information in the candidate body image region and body contour information in the determined candidate body image region; and determine a similarity based on a distance between the candidate body key points included in the candidate body image region and candidate body key points included in the determined candidate body image region; in response to determining that the contour center distance is less than a preset distance threshold, and the determined similarity is greater than a preset similarity threshold, determine that the candidate body image region is the redundant candidate body image region.

The apparatus provided by the above embodiment of the present disclosure, by acquiring a set of candidate body image regions in a target image, based on a body detection model; for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information; and determining a confidence score of the candidate body image region based on a sum of the confidences of the candidate body key points within the body contour; and determining a body image region from the set of candidate body image regions, based on the confidence scores of the candidate body image regions in the set of candidate body image regions, provides a body detection mechanism based on body contour information and body key points, and improves an accuracy of body detection.

Figure 7:
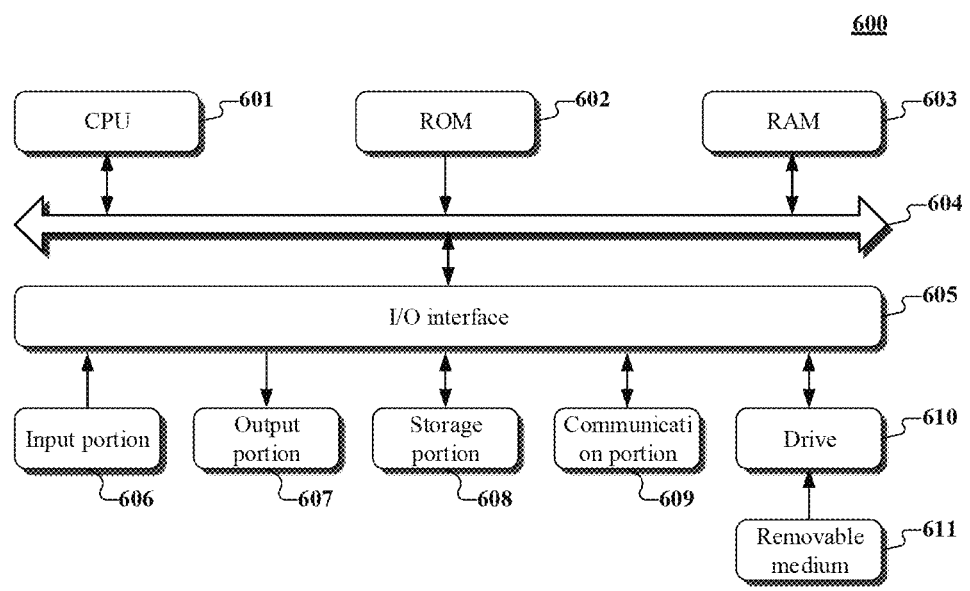
FIG. 7 is a schematic structural diagram of a computer system of a server or a terminal suitable for implementing some embodiments of the present disclosure.

With further reference to FIG. 7, a schematic structural diagram of a computer system 600 of a server or a terminal suitable for implementing the embodiments of the present disclosure is shown. The server or the terminal shown in FIG. 7 is merely an example, and should not impose any limitation on the function and scope of use of the embodiments of the present disclosure.

As shown in FIG. 7, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components may be connected to the I/O interface 605: an input portion 606 including, for example, a keyboard, a mouse and the like; an output portion 607 including, for example, a cathode ray tube (CRT), a liquid crystal display (LCD), etc., and a speaker and the like; the storage portion 608 including, for example, a hard disk and the like; and a communication portion 609 including a network interface card such as a LAN card, a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to the embodiments of the present disclosure, the processes described above with reference to the flowcharts may be implemented in a computer software program. For example, an embodiment of the present disclosure includes a computer program product, which includes a computer program that is tangibly embedded in a computer-readable medium. The computer program includes program codes for performing the method as illustrated in the flowcharts. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure. It should be noted that the computer-readable medium in the present disclosure may be computer-readable signal medium or computer-readable storage medium or any combination of the above two. An example of the computer-readable storage medium may include, but not limited to: electric, magnetic, optical, electromagnetic, infrared, or semiconductor systems, apparatus, elements, or a combination of any of the above. A more specific example of the computer-readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer-readable storage medium may be any physical medium containing or storing programs which may be used by a command execution system, apparatus or element or incorporated thereto. In the present disclosure, the computer-readable signal medium may include data signal in the base band or propagating as parts of a carrier, in which computer-readable program codes are carried. The propagating data signal may take various forms, including but not limited to: an electromagnetic signal, an optical signal or any suitable combination of the above. The signal medium that can be read by computer may be any computer-readable medium except for the computer-readable storage medium. The computer-readable medium is capable of transmitting, propagating or transferring programs for use by, or used in combination with, a command execution system, apparatus or element. The program codes contained on the computer-readable medium may be transmitted with any suitable medium including but not limited to: wireless, wired, optical cable, RF, etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through the Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, two blocks presented in succession may be executed, substantially in parallel, or they may sometimes be executed in a reverse sequence, depending on the function involved. It should also be noted that each block in the block diagrams and/or flowcharts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including an acquisition unit, a first determination unit and a second determination unit. Here, the names of these units do not in some cases constitute limitations to such units themselves. For example, the acquisition unit may also be described as "a unit configured to acquire a set of candidate body image regions in a target image, based on a body detection model".

In another aspect, the present disclosure further provides a computer-readable medium. The computer-readable medium may be included in the apparatus in the above described embodiments, or a stand-alone computer-readable medium not assembled into the apparatus. The computer-readable medium carries one or more programs. The one or more programs, when executed by the apparatus, cause the apparatus to: acquire a set of candidate body image regions in a target image, based on a body detection model; for a candidate body image region in the set of candidate body image regions: acquire position information and confidences of candidate body key points in the candidate body image region, based on a single body key point detection model; determine the candidate body key points within a body contour based on body contour information in the candidate body image region and the acquired position information; and determine a confidence score of the candidate body image region based on a sum of the confidences of the candidate body key points within the body contour; and determine a body image region from the set of candidate body image regions, based on the confidence scores of the candidate body image regions in the set of candidate body image regions.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. For example, technical solutions formed by the above-described features being interchanged with, but not limited to, technical features with similar functions disclosed in the present disclosure.

What is claimed is:

1. A method for detecting a body, the method comprising:
acquiring a set of candidate body image regions in a target image, based on a body detection model;
for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information of the candidate body key points; and determining a confidence score of the candidate body image region based on a sum of the confidences of the candidate body key points within the body contour; and
determining a body image region from the set of candidate body image regions, based on confidence scores of the candidate body image regions in the set of candidate body image regions.

2. The method according to claim 1, wherein after the determining a body image region from the set of candidate body image regions, based on confidence scores of the candidate body image regions in the set of candidate body image regions, the method further comprises:
determining the candidate body key points in the determined body image region as body key points of the body contour.

3. The method according to claim 1, wherein
the acquiring a set of candidate body image regions in a target image, based on a body detection model, comprises:
acquiring, based on the body detection model, the set of candidate body image regions in the target image and a confidence that the candidate body image region in the set of candidate body image regions is the determined body image region; and
the determining a confidence score of the candidate body image region based on a sum of the confidences of the candidate body key points within the body contour, comprises:
determining the confidence score of the candidate body image region, based on the sum of the confidences of the candidate body key points within the body contour and the confidence that the candidate body image region is the determined body image region.

4. The method according to claim 3, wherein the determining the confidence score of the candidate body image region, based on the sum of the confidences of the candidate body key points within the body contour and the confidence that the candidate body image region is the determined body image region, comprises:
performing, based on a preset weight, weighted summation of the sum of the confidences of the candidate body key points within the body contour, the confidence that the candidate body image region is the determined body image region, and a sum of confidences of candidate body key points outside the body contour, to obtain the confidence score of the candidate body image region, wherein a weight set for the sum of the confidences of the candidate body key points within the body contour, is greater than a weight set for the sum of the confidences of the candidate body key points outside the body contour.

5. The method according to claim 1, wherein the acquiring position information of candidate body key points in the candidate body image region, comprises:
acquiring the position information of candidate body key points in the candidate body image region, based on a convolutional neural network model.

6. The method according to claim 5, wherein the acquiring position information of candidate body key points in the candidate body image region, comprises:
determining, by a cascading network structure, the position information of candidate body key points in the candidate body image region, combined with global information and local information of the candidate body image region.

7. The method according to claim 6, wherein,
the cascading network structure is a cascaded network structure obtained by cascading multiple identical network models in sequence;
a full convolutional layer is connected to an end of a last network model in the cascading network structure, to output a heat map corresponding to each candidate body key point;
the heat map represents a probability that the candidate body key point exists in each pixel point of the candidate body image region; and
one heat map corresponds to one candidate body key point.

8. The method according to claim 7, wherein the acquiring position information of candidate body key points in the candidate body image region, comprises:
for each heat map:
determining a position of a pixel point with a greatest probability in the candidate body image region based on the heat map; and
determine the determined position as a position of a candidate body key point corresponding to the heat map.

9. The method according to claim 8, wherein for each heat map:
a confidence of the candidate body key point corresponding to the heat map is a probability corresponding to the pixel point with a greatest probability determined based on the heat map.

10. The method according to claim 1, wherein the determining a body image region from the set of candidate body image regions, based on confidence scores of the candidate body image regions in the set of candidate body image regions, comprises:

- determining, from the set of candidate body image regions, a candidate body image region having a confidence score exceeding a preset score threshold, or a candidate body image region ranked a first preset number of candidate body image regions according to the confidence score in descending order;
- searching redundant candidate body image regions from the determined candidate body image region in the set of candidate body image regions; and
- removing the searched candidate body image regions.

11. The method according to claim 10, wherein the searching redundant candidate body image regions from the determined candidate body image region in the set of candidate body image regions, comprises:

- for the candidate body image region in the set of candidate body image regions:
  - determining a contour center distance based on the body contour information in the candidate body image region and body contour information in the determined candidate body image region;
  - determining a similarity based on a distance between the candidate body key points included in the candidate body image region and candidate body key points included in the determined candidate body image region; and
  - determining, in response to determining that the contour center distance is less than a preset distance threshold, and the determined similarity is greater than a preset similarity threshold, the candidate body image region is the redundant candidate body image region.

12. An electronic device, comprising:

one or more processors;

a storage apparatus, storing one or more programs thereon;

the one or more programs, when executed by the one or more processors, cause the one or more processors to implement an operation for detecting a body, comprising:

acquiring a set of candidate body image regions in a target image, based on a body detection model;

for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information of the candidate body key points; and determining a confidence score of the candidate body image region based on a sum of the confidences of the candidate body key points within the body contour; and determining a body image region from the set of candidate body image regions, based on confidence scores of the candidate body image regions in the set of candidate body image regions.

13. The device according to claim 12, wherein after the determining a body image region from the set of candidate body image regions, based on confidence scores of the candidate body image regions in the set of candidate body image regions, the method further comprises:

determining the candidate body key points in the determined body image region as body key points of the body contour.

14. The device according to claim 12, wherein the acquiring a set of candidate body image regions in a target image, based on a body detection model, comprises:

acquiring, based on the body detection model, the set of candidate body image regions in the target image and a confidence that the candidate body image region in the set of candidate body image regions is the determined body image region; and the determining a confidence score of the candidate body image region based on a sum of the confidences of the candidate body key points within the body contour, comprises:

determining the confidence score of the candidate body image region, based on the sum of the confidences of the candidate body key points within the body contour and the confidence that the candidate body image region is the determined body image region.

15. The device according to claim 14, wherein the determining the confidence score of the candidate body image region, based on the sum of the confidences of the candidate body key points within the body contour and the confidence that the candidate body image region is the determined body image region, comprises:

performing, based on a preset weight, weighted summation of the sum of the confidences of the candidate body key points within the body contour, the confidence that the candidate body image region is the determined body image region, and a sum of confidences of candidate body key points outside the body contour, to obtain the confidence score of the candidate body image region, wherein a weight set for the sum of the confidences of the candidate body key points within the body contour, is greater than a weight set for the sum of the confidences of the candidate body key points outside the body contour.

16. The device according to claim 12, wherein the acquiring position information of candidate body key points in the candidate body image region, comprises:

acquiring the position information of candidate body key points in the candidate body image region, based on a convolutional neural network model.

17. The device according to claim 16, wherein the acquiring position information of candidate body key points in the candidate body image region, comprises:

determining, by a cascading network structure, the position information of candidate body key points in the candidate body image region, combined with global information and local information of the candidate body image region.

18. The device according to claim 17, wherein, the cascading network structure is a cascaded network structure obtained by cascading multiple identical network models in sequence;

a full convolutional layer is connected to an end of a last network model in the cascading network structure, to output a heat map corresponding to each candidate body key point;

the heat map represents a probability that the candidate body key point exists in each pixel point of the candidate body image region; and one heat map corresponds to one candidate body key point.

19. The device according to claim 18, wherein the acquiring position information of candidate body key points in the candidate body image region, comprises:
- for each heat map:
  - determining a position of a pixel point with a greatest probability in the candidate body image region based on the heat map; and
- determine the determined position as a position of a candidate body key point corresponding to the heat map.

20. A non-transitory computer-readable medium, storing a computer program thereon, the program, when executed by a processor, implements an operation for detecting a body, comprising:
- acquiring a set of candidate body image regions in a target image, based on a body detection model;
- for a candidate body image region in the set of candidate body image regions: acquiring position information and confidences of candidate body key points in the candidate body image region, based on a single body key point detection model; determining the candidate body key points within a body contour based on body contour information in the candidate body image region and the acquired position information of the candidate body key points; and determining a confidence score of the candidate body image region based on a sum of the confidences of the candidate body key points within the body contour; and
- determining a body image region from the set of candidate body image regions, based on confidence scores of the candidate body image regions in the set of candidate body image regions.

* * * * *